US 8,475,665 B2

(12) United States Patent
Casasanta, III

(10) Patent No.: US 8,475,665 B2
(45) Date of Patent: Jul. 2, 2013

(54) NANOPARTICLE FILTER

(75) Inventor: Vincenzo Casasanta, III, Woodinville, WA (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/059,131

(22) PCT Filed: Jul. 15, 2010

(86) PCT No.: PCT/US2010/042099
§ 371 (c)(1),
(2), (4) Date: Feb. 15, 2011

(87) PCT Pub. No.: WO2012/008963
PCT Pub. Date: Jan. 19, 2012

(65) Prior Publication Data
US 2012/0012533 A1    Jan. 19, 2012

(51) Int. Cl.
*B01D 21/01* (2006.01)
(52) U.S. Cl.
USPC ............ 210/748.1; 210/748.01; 210/748.06; 210/748.08; 210/702; 210/738; 422/186; 422/186.3; 422/22; 422/24; 250/435; 977/773; 977/840; 359/238; 359/308; 506/30
(58) Field of Classification Search
USPC ................. 210/702, 748.01, 748.06, 748.08, 210/748.1, 151, 264, 294, 295, 297; 422/186, 422/186.3, 22, 24, 121; 977/773, 804; 436/518; 250/435; 506/30; 359/238, 308
See application file for complete search history.

(56) References Cited

U.S. PATENT DOCUMENTS

| | | | |
|---|---|---|---|
| 6,846,565 B2 * | 1/2005 | Korgel et al. | 428/402 |
| 7,060,510 B2 | 6/2006 | Bonnell et al. | |
| 7,696,473 B2 | 4/2010 | Quidant et al. | |
| 7,829,839 B2 * | 11/2010 | Liu et al. | 250/251 |
| 2008/0069758 A1 | 3/2008 | Campbell | |
| 2010/0105053 A1 * | 4/2010 | Cho et al. | 435/6 |
| 2010/0167958 A1 | 7/2010 | Lin et al. | |

OTHER PUBLICATIONS

Zhang et al. (2006), "Optical trapping and light-induced agglomeration of gold nanoparticle aggregates"; Physical Review, 73: p. 165405-1-165405-9.
Zelenina et al. (2007), "Enhanced optical forces between coupled resonant metal nanoparticles"; Optics Letters, 32 (9): p. 1156-1158.
Volpe et al. (2006), "Surface Plasmon Radiation Forces"; Physical Review Letters, 96: p. 238101-1-23810-4.

(Continued)

*Primary Examiner* — Joseph Drodge
*Assistant Examiner* — Cameron J Allen
(74) *Attorney, Agent, or Firm* — Steven S. Rubin, Esq.; Moritt Hock & Hamroff LLP

(57) ABSTRACT

Technologies are generally described for a nanoparticle filter and system effective to move a nanoparticle from a fluid to a location. In some examples, the method includes providing the fluid including the nanoparticles. In some examples, the method further includes applying a first light to the fluid to create a first plasmon. In some examples, the first plasmon is effective to aggregate the nanoparticles to generate a nanoparticle aggregation. In some examples, the method includes applying a second light to the fluid to create a second plasmon. In some examples, the second plasmon is effective to move the nanoparticle aggregation to a location.

10 Claims, 6 Drawing Sheets

OTHER PUBLICATIONS

Mohanty et al. (2004), "Optical binding between dielectric particles"; Optics Express, 12(12): p. 2749-2756.
Svoboda et al. (1994), "Optical trapping of metallic Rayleigh particles", Optics Letters, 19(13): p. 930-932.
Hansen et al. (2005), "Expanding the Optical Trapping Range of Gold Nanoparticles"; Nano Letters, 5(10): p. 1937-1942.
Wang et al. (2009), "Propulsion of Gold Nanoparticles with Surface Plasmon Polaritons: Evidence of Enhanced Optical Force from Near-Field Coupling between Gold Particle and Gold Film"; Nano Letters, 9(7): p. 2623-2629.
Xu et al. (2002), "Surface-Plasmon-Enhanced Optical Forces in Silver Nanoaggregates"; Phys. Rev. Lett., 89(24): p. 246802-1-246802-4.
Zelenina, et al. (2006), "Tunable optical sorting and maniupulation of nanoparticles via plasmon excitation"; Optics Letters, 31(13): p. 2054-2056.
Song et al. (2001), "Force of surface plasmon-coupled evanescent fields on Mie particles", Optics Communications, 198: p. 7-19.
Righini et al. (2007) "Parallel and selective trapping in a patterned plasmonic landscape"; Nature Physics, 3: p. 477-480.
Garcés-Chávez et al. (2006) "Extended organization of collidal nanoparticles by surface plasmon polariton excitation"; Phys. Rev. B, 73: 085417-1-085417-5.
Yang et al. (2009) "Forces and Transport Velocities for a Particle in a Slot Waveguide"; Nano Lett., 9(3): p. 1182-1188.
Svedberg et al. (2006) "Creating Hot Nanoparticles Pairs for Surface-Enhanced Raman Spectroscopy through Optical Manipulation"; Nano Lett., 6(12): 2639-2641.
Noguez (2007) "Surface Plasmons on Metal Nanoparticles: The Influence of Shape and Physical Environment", J. Phys. Chem. 111(10): 3806-3819.
Atay et al. (2004) "Strongly Interacting Plasmon Nanoparticle Pairs: From Dipole-Dipole Interaction to Conductively Coupled Regime"; Nano Lett. 4(9): 1627-1631.
PCT International Search Report PCT/ISA/210, Sep. 10, 2010.
PCT Written Opinion of the International Searching Authority PCT/ISA/220, Sep. 10, 2010.
"Plasmon" retrieved from Wikipedia.org. on Apr. 2, 2010.

* cited by examiner

102

102

102

NANOPARTICLE FILTER

BACKGROUND

Unless otherwise expressly indicated herein, none of the material presented in this section is prior art to the claims of this application and is not admitted to be prior art by having been included herein.

Manufacturing and chemical processes may produce desired fluids including undesired particles. The fluids and the particles may be fed to a filter. The filter may be used to remove at least some of the undesired particles from the fluids.

SUMMARY

In one example, a method is described for removing nanoparticles from a fluid. In some examples, the method includes applying a first light to the fluid to create a first plasmon. In some examples, the first plasmon is effective to aggregate the nanoparticles to generate a nanoparticle aggregation. In some examples, the method includes applying a second light to the fluid to create a second plasmon. In some examples, the second plasmon is effective to move the nanoparticle aggregation to a location.

In another example a nanoparticle filter is described. In some examples, the nanoparticle filter includes a chamber including at least one wall and at least one port. In some examples, the chamber is configured to hold a fluid including nanoparticles and to allow transmission of light energy sufficient to create one or more plasmons. In some examples, the nanoparticle filter includes a light source configured to provide light energy to the chamber sufficient to create the one or more plasmons. In some examples, the plasmons are effective to generate a net force vector on one or more nanoparticles sufficient to move the one or more nanoparticles toward the at least one port.

In another example, a nanoparticle filter system is described. In some examples, the nanoparticle filter system includes a reservoir effective to hold a fluid. In some examples, the nanoparticle filter system includes a chamber including at least one wall and at least one port. In some examples, the chamber is configured to allow transmission of light energy sufficient to create one or more plasmons. In some examples, the chamber is in fluid communication with the reservoir. In some examples, the nanoparticle filter system includes a light source configured to provide light energy to the chamber sufficient to create the one or more plasmons. In some examples, the nanoparticle filter system includes a processor in communication with the light source. In some examples, the processor is effective to control the light source to apply a first light to a first location of the chamber to create a first plasmon. In some examples, the first plasmon is effective to generate a first particle aggregation. In some examples, the processor is effective to control the light source to apply a second light to a second location of the chamber to create a second plasmon. In some examples, the second plasmon is effective to generate a second particle aggregation. In some examples, the first and second plasmons are further effective to move the nanoparticles from the fluid toward the port.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

Figure 1:
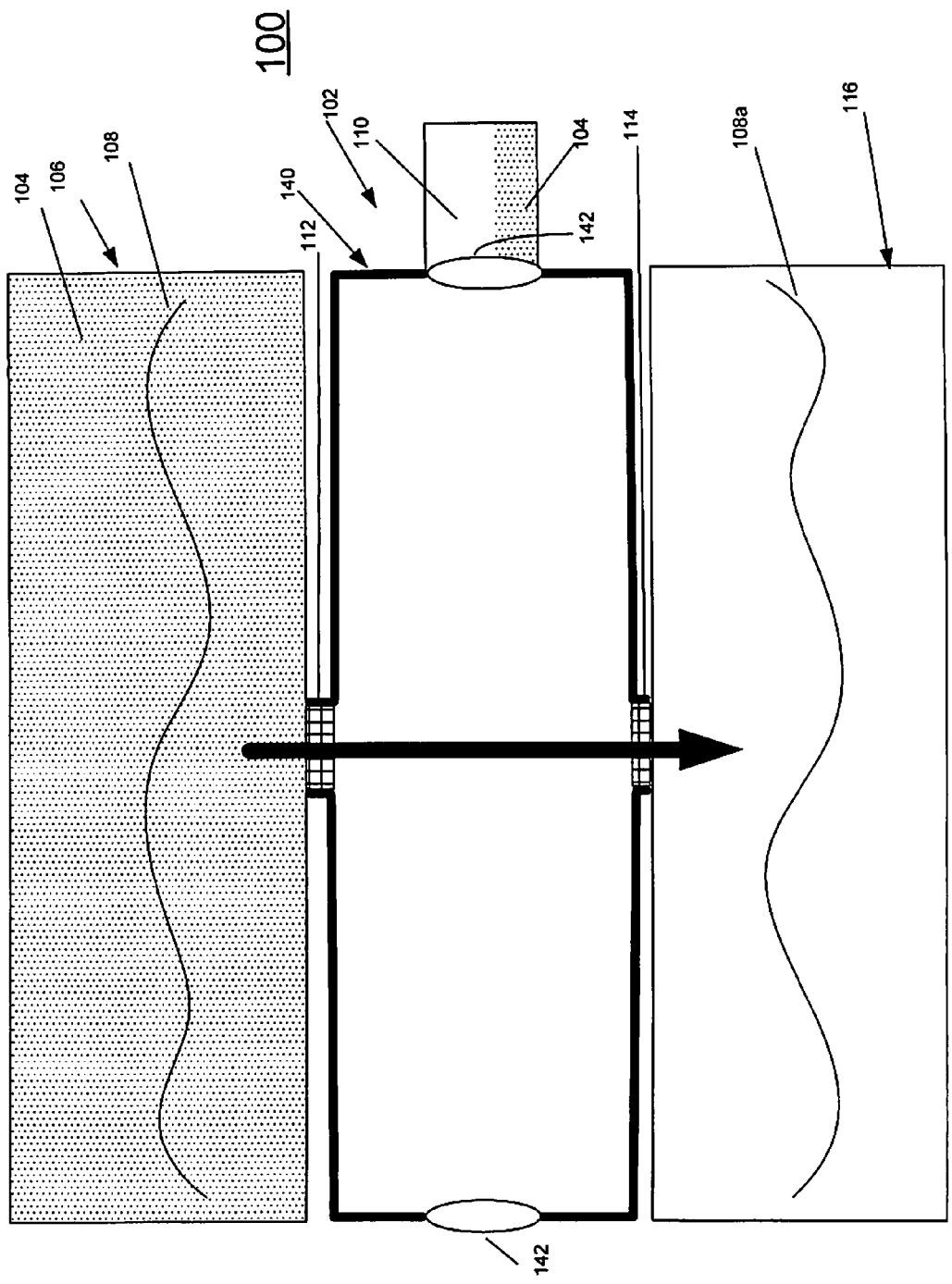
FIG. 1 is a side view of an illustrative embodiment of a nanoparticle filter system.

all arranged according to at least some embodiments described herein.

DETAILED DESCRIPTION

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

This disclosure is generally drawn, inter alia, to apparatuses, systems, devices and methods relating to a nanoparticle filter.

Briefly stated, technologies are generally described for a nanoparticle filter and system effective to move a nanoparticle from a fluid to a location. In some examples, the method includes providing the fluid including the nanoparticles. In some examples, the method further includes applying a first light to the fluid to create a first plasmon. In some examples, the first plasmon is effective to aggregate the nanoparticles to generate a nanoparticle aggregation. In some examples, the method includes applying a second light to the fluid to create a second plasmon. In some examples, the second plasmon is effective to move the nanoparticle aggregation to a location.

FIG. 1 is a side view of an illustrative embodiment of a nanoparticle filter system. In some examples, a nanoparticle filter system 100 may include a reservoir 106, a nanoparticle filter 102, and an outlet container 116. Reservoir 106 may hold a fluid 108 including nanoparticles 104. In some examples, nanoparticle filter 102 may include a chamber 140, an inlet port 112, an outlet port 114, a port 142, and a nanoparticle container 110. Inlet port 112 may be in fluid communication with reservoir 106. Outlet port 114 may be in fluid communication with outlet container 116. As discussed in more detail below, in some examples, fluid 108 from reservoir 106 may be fed into nanoparticle filter 102 though inlet port 112. In some examples, nanoparticle filter 102 may be adapted to move at least some nanoparticles 104 from fluid 108 through port 142 and to container 110. In some examples, container 110 may be filled with a fluid medium that is similar in nature to fluid 108 to be filtered. In some examples, there is no significant differential in pressure between chamber 140 and container 110. In some examples, chamber 140 may be filled with fluid 108 upon applying light to chamber 140 (as discussed below). In other examples, chamber 140 may be filled with fluid 108 prior to applying light to chamber 140 through port 142. In some examples, fluid 108a, having 20-80% fewer nanoparticles 104 than fluid 108 may then be fed to outlet container 116 through outlet port 114.

In some examples, nanoparticles 104 may be a particle of any shape, including but not limited to, spheroid, oblong, polygonal, and globular structure and/or material such as, but not limited to metals, inorganics, ceramics, organics, organometallics, polymers, biochemicals, and biologicals, or combination of materials and have all three physical dimensions within the range of about 1 nm to about 100 nm. In some examples, fluid 108 may be an aqueous solution, including but not limited to acidic or basic media or an organic solvent or media. In some examples, nanoparticles 104 may be suspended in fluid 108. Particles other than nanoparticles 104 may also be suspended in fluid 108.

Several technological areas, produce nanoparticle suspensions that provide examples for an application of nanoparticle filter 102. For example, several immunoassay techniques use gold (Au) or silver (Ag) nanoparticle tagging to proteins and peptides. If the tagged sample proteins need to be separated and collected after the immunoassay is produced, the nanoparticle filter may be able to accomplish this separation without the use of membrane type filters.

Figure 2:
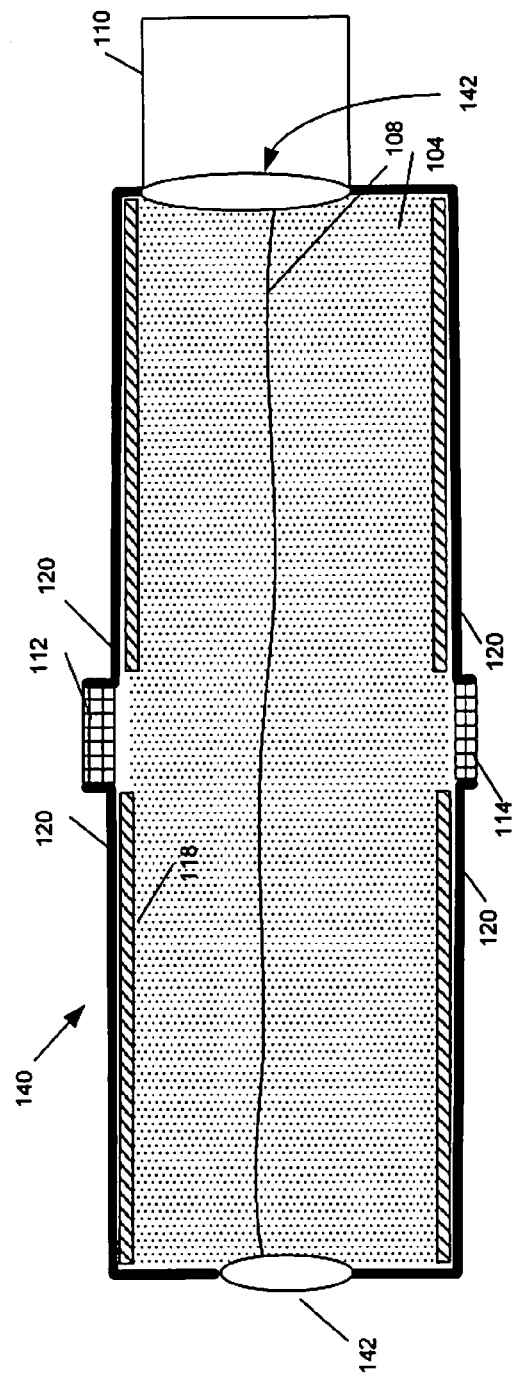
FIG. 2 is a side view of an illustrative embodiment of a nanoparticle filter.

FIG. 2 is a side view of an illustrative embodiment of a nanoparticle filter. The filter of FIG. 2 is substantially similar to filter 102 in system 100 of FIG. 1, with additional details. Those components in FIG. 2 that are labeled identically to components of FIG. 1 will not be described again for the purposes of clarity.

FIG. 2 shows fluid 118 with nanoparticles 104 inside nanoparticle filter 102. In some examples, chamber 140 may be defined by at least one wall 120. In some examples, wall 120 may be composed of a transparent material such as glass or plastic with an index of refraction capable of coupling a surface plasmon into a fluid held by chamber 140 (as discussed below). In some examples, an index of refraction greater than 1.9 may be used. In some examples, chamber 140 may be in a shape of a parallelepiped with widths and lengths from about 1 cm to about 20 cm. In some examples, wall 120 may have a thickness from about 0.5 mm to about 5 mm. In examples where nanoparticles 104 include an insulator such as, but not limited to, oxides, polymers, organic compounds, biochemicals, and biologicals, walls 120 may be internally coated with a metal film 118. Metal film 118 may be coated on walls 120 uniformly or non-uniformly and may be coated on all walls 120 and/or only on some walls 120. Metal film 118 could be part of walls 120. In some examples, metal film 118 may include, but is not limited to, gold, silver, palladium, copper, rhodium, and/or mixtures thereof, etc. and may have a thickness ranging from about 10 nm to about 200 nm. In examples where nanoparticles 104 include a conductive or semiconductive metal or compound, film 118 may be excluded. In some examples, walls 120 may be transparent to the wavelength(s) of light applied to walls 120 as is discussed in more detail below, and may be formed of materials such as but not limited to glass or plastic with an index of about 1.9 to about 2.5. In an example, nanoparticle filter 102 may be fabricated from two glass slides with spacers. In other examples, chamber 140 may be produced or formed to a net shape by molding or machining.

Figure 3:
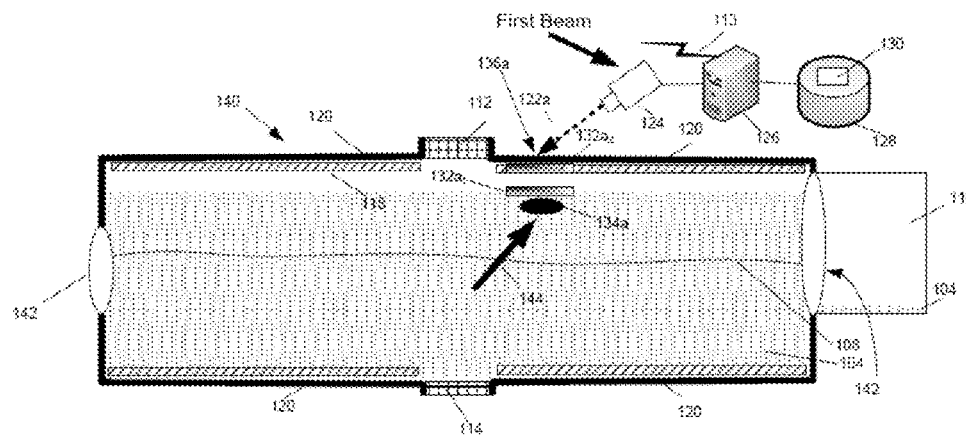
FIG. 3 is a side view of an illustrative embodiment of a nanoparticle filter.
Figure 4:
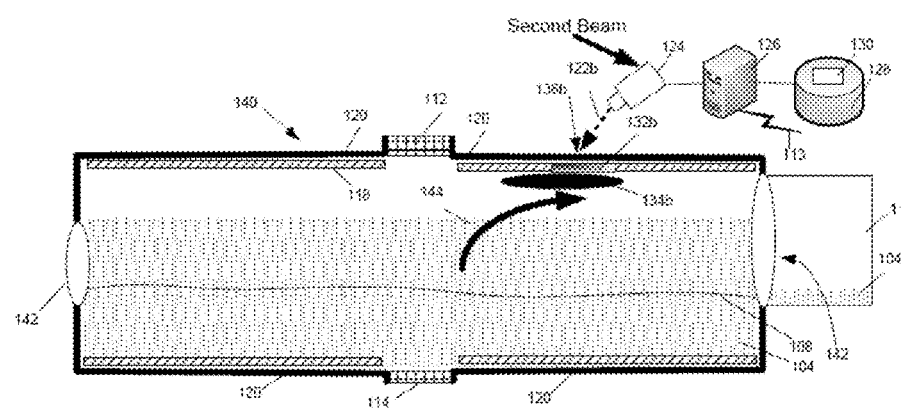
FIG. 4 is a side view of an illustrative embodiment of a nanoparticle filter.
Figure 5:
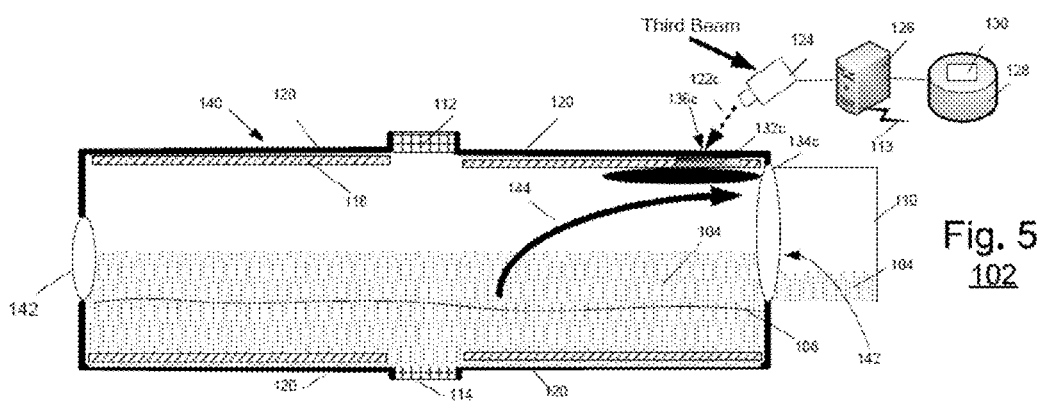
FIG. 5 is a side view of an illustrative embodiment of a nanoparticle filter.

FIGS. 3, 4 and 5 are side views of illustrative embodiments of nanoparticle filters in accordance with at least some embodiments described herein. The filters of FIGS. 3, 4, 5 are substantially similar to filter 102 of FIGS. 1 and 2, with additional details. Those components in FIGS. 3, 4 and 5 that are labeled identically to components of FIGS. 1 and 2 will not be described again for the purposes of clarity.

FIGS. 3, 4 and 5 illustrate an example of how nanoparticle filter 102 may be used to remove at least some nanoparticles 104 from fluid 108. In some examples, nanoparticle filter 102 may include a light source 124 such as but not limited to a laser, light emitting diode, filtered incandescent light, filtered arc tube, or filtered fluorescent lamp. In some examples, light source 124 may be oriented at an angle with wall 120 such that a surface plasmon polariton is coupled into metal film 118 or metal nanoparticles 104. In some examples, light source 124 and a memory 128 may both be in communication with a processor 126. In some examples, processor 126 may further be in communication with inlet port 112 and outlet port 114 through a communication link 113 such as a data wire or a wireless network. Processor 128 may be configured to control inlet port 112 and outlet port 114 to provide fluid 108 into and out of chamber 140. In some examples, one light source 124 may be used for each wall 120. In some examples, more than one light source may be used on each of one or more walls 120. Light source 124 may be configured to generate a beam 122 that may be incident upon either film 118 and/or fluid 108 through wall 120. Memory 128 may be configured to include a set of instructions 130 used by processor 126 to control light source 124.

Focusing on FIG. 3, fluid 108 including nanoparticles 104 shown inside chamber 140 of filter 102. Chamber 140 may be configured to hold fluid 108. In some examples, processor 126 may be configured to feed fluid 108 into filter 102 through inlet port 112. In some examples, processor 126 may be configured to close inlet port 112 and outlet port 114 so that fluid 118 may be allowed to settle in chamber 140. In some examples, fluid 118 may be continuously fed through inlet port 112 and outlet port 114 at a flow rate of less than 0.1 cubic centimeters per minute (ccm).

In some examples, while fluid 108 is held inside chamber 140, processor 126 may be configured to control light source 124 to apply light beam 122a to wall 120 at a first location 136a at an angle of incidence capable of coupling a plasmon into metal film 118 or nanoparticles 104. The particular angle may be a function of wavelength, index of refraction, composition and thickness of metal film 118, and composition and size range of nanoparticle 104. In some examples, beam 122a may be light in a range of wavelengths such as from about 300 nm to about 700 nm. Beam 122 may include a single polarized wavelength, a band of wavelengths or multiple wavelengths and may be pulsed, continuous, or of any other duty cycle. A variety of configurations in wavelength and incidence angles may be used based on application. In an example, for insulating inorganic oxide nanoparticles in the size range of 10-60 nm, a 6 nm metal film 118 composed of Au may couple plasmons into an aqueous suspension fluid using 600 nm red light incident at an angle between 30° and 60°. In some examples, as beam 122a hits wall 120, wall 120 bends beam 122a, due to refraction by walls 120, to be incident on film 118 and/or fluid 108. As mentioned above, walls 120 may be transparent and of a desired index to bend or refract beam 122a toward a plane of film 118 and/or fluid 108.

In some examples, when beam 122 hits film 118 and/or fluid 108, surface plasmon polaritons or plasmons 132 may be generated in the plane $132_{a2}$ of metal film 118. Plasmon oscillation 132 may be coupled into fluid 108 as an evanescent wave denoted as $132a_1$ near an interface of film 118 and fluid 108. In some examples, beam 122 may be configured to provide light energy sufficient to create plasmons 132. In some examples, plasmons 132 may be a collective oscillation of conduction electrons within metal film 118 and extending into fluid 108 as an interfacial optical excitation. In some examples, beam 122 may be polarized parallel to the plane of metal film 118 and produce an oscillation mode matched to the plasmon excitation energy $132a_2$ for the given conductor used in metal film 118. In examples where nanoparticles 104 are made of conductive or semiconductive metals or compounds, plasmons 132 may be created within nanoparticles 104 themselves as shown at $132a_1$. In examples where nanoparticles 104 are made of an electrically insulating material, plasmon $132a$ (including $132a_1$ and $132a_2$) may be created in film 118 and coupled to fluid 108 as shown at $132a_2$. Plasmon $132a$ (including $132a_1$ and $132a_2$) may aggregate nanoparticles 104 to generate a nanoparticle aggregation 134a due to, at least in part, optically induced attractive forces between resonantly coupled nanoparticle supported plasmons and optical traps. The generation of nanoparticle aggregation 134a generates a net force vector 144 and moves at least some nanoparticles 104 from fluid 118 as illustrated by the slight decrease in nanoparticle concentration between FIG. 2 and FIG. 3.

FIG. 3 shows beam 122a applied to wall 120 at first location 136a. FIG. 4 shows beam 122b applied to wall 120 at a second location 136b. In some examples, beam 122b could be moved to location 136b by using an electromagnetic or electromechanical actuated mirror in light source 124. By applying beam 122b to wall 120 at second location 136b, plasmon 132b is created near second location 136b. Plasmon 132b may aggregate nanoparticles 104 to generate a nanoparticle aggregation 134b. Nanoparticles in nanoparticle aggregation 134b may include nanoparticles 104 in fluid 108 and nanoparticles from nanoparticle aggregation 134a. Nanoparticle aggregation 134b may be larger than nanoparticle aggregation 134a. Moreover, nanoparticle aggregation 134b is closer to port 142 because, at least in part, location 136b of plasmon 132b is closer to port 142 than location 136a. The generation of nanoparticle aggregation 134b continues to generate net force vector 144 and move at least some nanoparticles 104 from fluid 118 as illustrated by the slight decrease in nanoparticle concentration between FIG. 3 and FIG. 4.

FIG. 4 shows beam 122b applied to wall 120 at second location 136b. FIG. 5 shows beam 122c applied to wall 120 at a third location 136c. By applying beam 122c to wall 120 at third location 136c, plasmon 132c is created near third location 136c. Plasmon 132c may aggregate nanoparticles 104 to generate a nanoparticle aggregation 134c. Nanoparticles in nanoparticle aggregation 134c may include nanoparticles 104 in fluid 108 and nanoparticles from nanoparticle aggregations 134a, 134b. Nanoparticle aggregation 134c may be larger than nanoparticle aggregations 134a and 134b. Moreover, nanoparticle aggregation 134c is closer to port 142 because, at least in part, location 136c of plasmon 132c is closer to port 142 than location 136b. The generation of nanoparticle aggregation 134c continues to generate net force vector 144 and move at least some nanoparticles 104 from fluid 118 as illustrated by the slight decrease in nanoparticle concentration between FIG. 4 and FIG. 5.

By selecting multiple locations 136 to apply beam 122 to chamber 140, at least some nanoparticles 104 may be removed from fluid 108 to port 142 and to another location such as nanoparticle container 110. In some examples, a cycle of locations 136 may be used with a defined repetition and/or duty cycle. In some examples, a duty cycle of about 1/100 Hz to about 1/10 Hz could be used for locations 136. The repetition rate may be governed by the electromagnetic or electromechanical actuation of light source 122. Continuous cycles of spotwise illumination across the wall 120 may allow for the stepwise removal of nanoparticles 104 from solution 108 to container 110. In some examples, beam 122 may have an illumination power density output of about 1 watt/mm$^2$ to about 100 watts/mm$^2$.

Among other potential benefits, nanoparticle filter 102 could be used in microfluidic devices and/or with lab on a chip applications. Multiple filters 102 may be placed in communication in series or in parallel to move nanoparticles of different sizes. For example, some filters 102 may have beams 122 with an intensity, wavelength, spectra, angle of incidence, power, polarization, etc. focused on a particular nanoparticle size or range.

Figure 6:
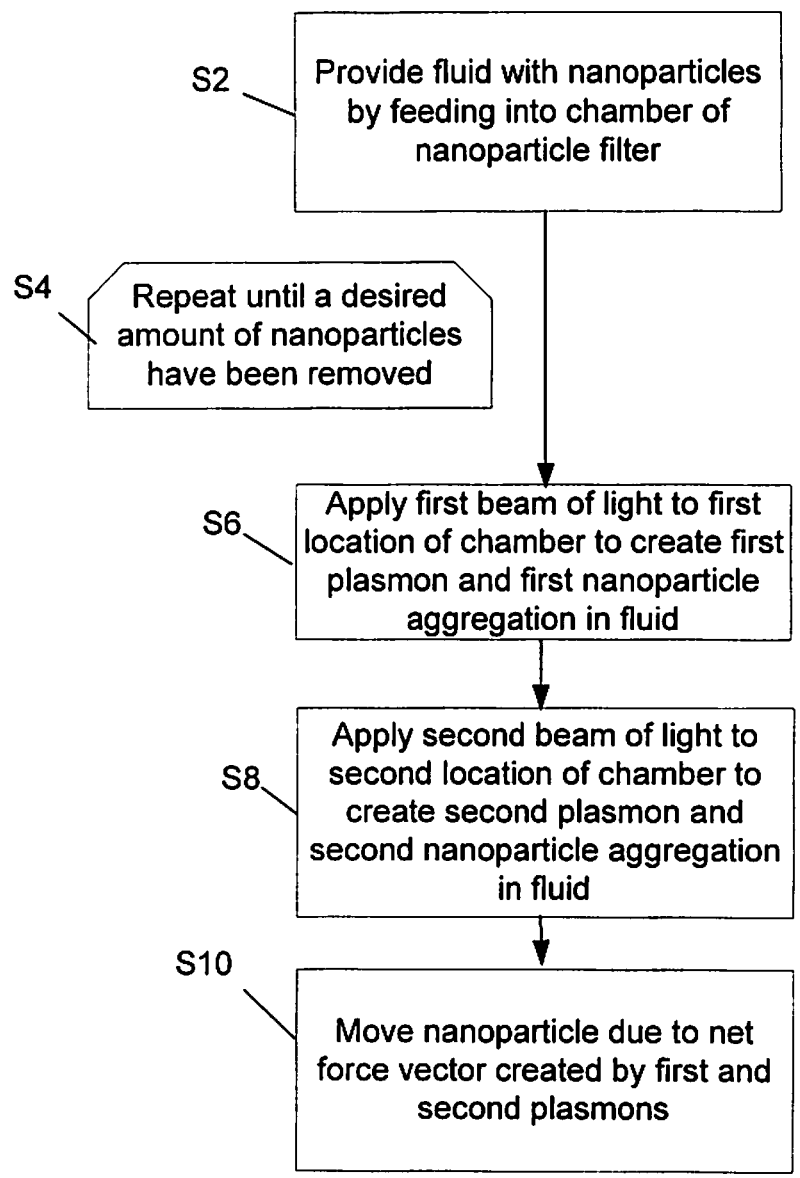
FIG. 6 depicts a flow diagram for example processes for implementing a nanoparticle filter.

FIG. 6 depicts a flow diagram for example processes for implementing a nanoparticle filter in accordance to at least some embodiments described herein. The process in FIG. 6 could be implemented using, for example, filter 102 discussed above. An example process may include one or more operations, actions, or functions as illustrated by one or more of blocks S2, S4, S6, S8 and/or S10. Although illustrated as discrete blocks, various blocks may be divided into additional blocks, combined into fewer blocks, or eliminated, depending on the desired implementation. Processing may begin at block S2.

At block S2, a fluid with nanoparticles may be provided by being fed into a chamber of a nanoparticle filter. For example, a processor may be configured to control the feeding of the fluid through an inlet port of the filter. Processing may continue from block S2 to block S4.

At block S4, a loop may be created so that blocks S6, S8 and S10 are repeated until a desired amount of nanoparticles have been removed from the fluid. For example, the removal of nanoparticles can be monitored by measuring the concentration of nanoparticles in the solution at any give time using a number of in-situ optical techniques such as optical scattering and optical spectroscopy techniques. Processing may continue from block S4 to block S6.

At block S6, a processor may be configured to control a light source to apply a first beam of light at a first location of the chamber. The first beam of light may create a first plasmon in the fluid. The first plasmon may create a first nanoparticle aggregation. Processing may continue from block S6 to block S8.

At block S8, a processor may be configured to control a light source to apply a second beam of light at a second location of the chamber. The second beam of light may create a second plasmon in the fluid. The second plasmon may create a second nanoparticle aggregation. Processing may continue from block S8 to block S10.

At block S10, the nanoparticle may be moved from the fluid to a location due to a net force vector created by the first and second plasmons.

Figure 7:
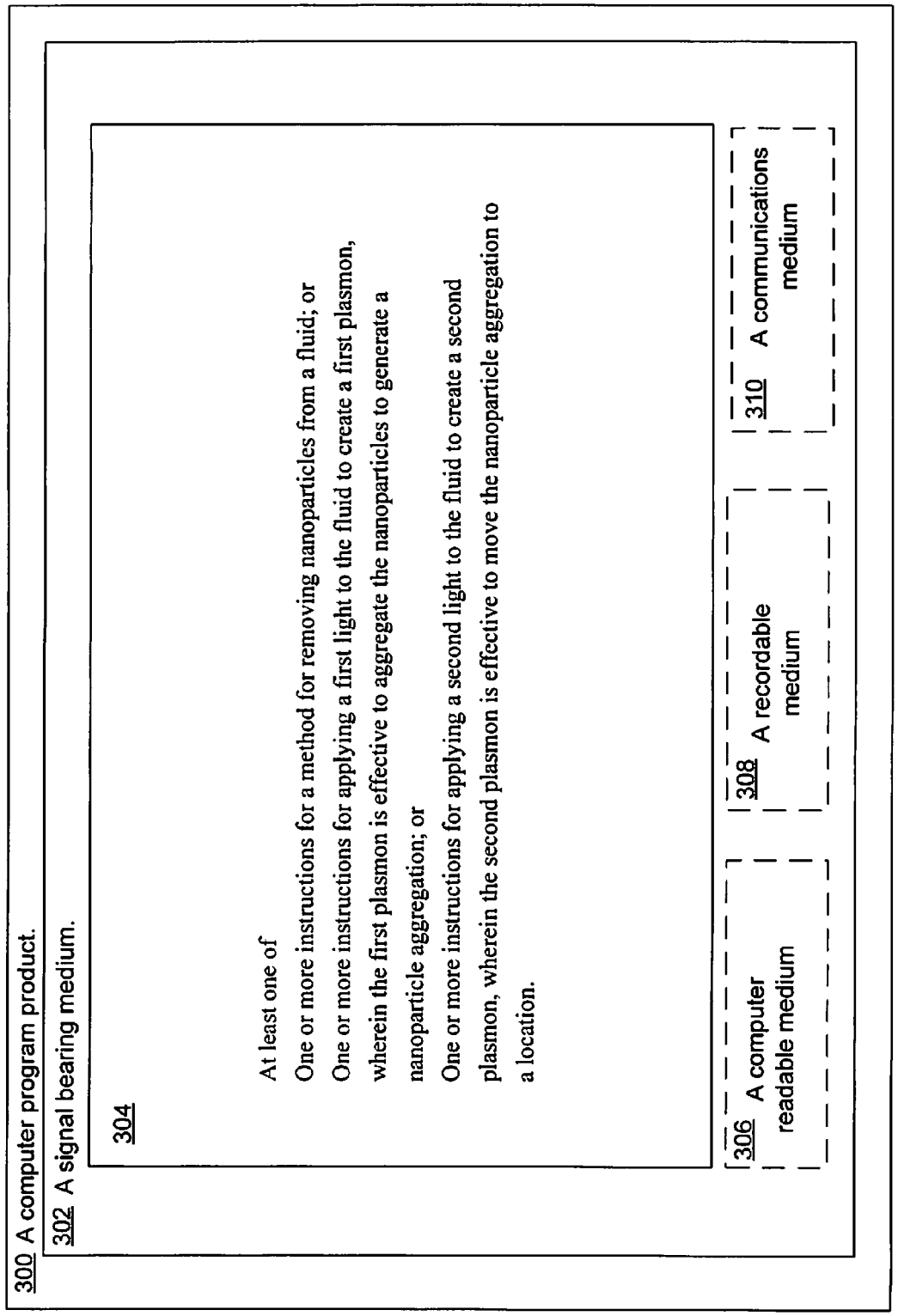
FIG. 7 illustrates example computer program products for implementing a nanoparticle filter.

FIG. 7 illustrates an example computer program product 300 for implementing a nanoparticle filter in accordance with at least some embodiments described herein. Program product 300 may include a signal bearing medium 302. Signal bearing medium 302 may include one or more instructions 304 that, when executed by, for example, a processor, may provide at least some of the functions described above with respect to FIGS. 1-6. Thus, for example, referring to filter 102, processor 126 may undertake one or more of the blocks shown in FIG. 7 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of filter 102 by an RF signal bearing medium 302, where the signal bearing medium 302 is conveyed by a wireless communications medium 310 (e.g., a wireless communications medium conforming with the IEEE 802.11 standard).

Figure 8:
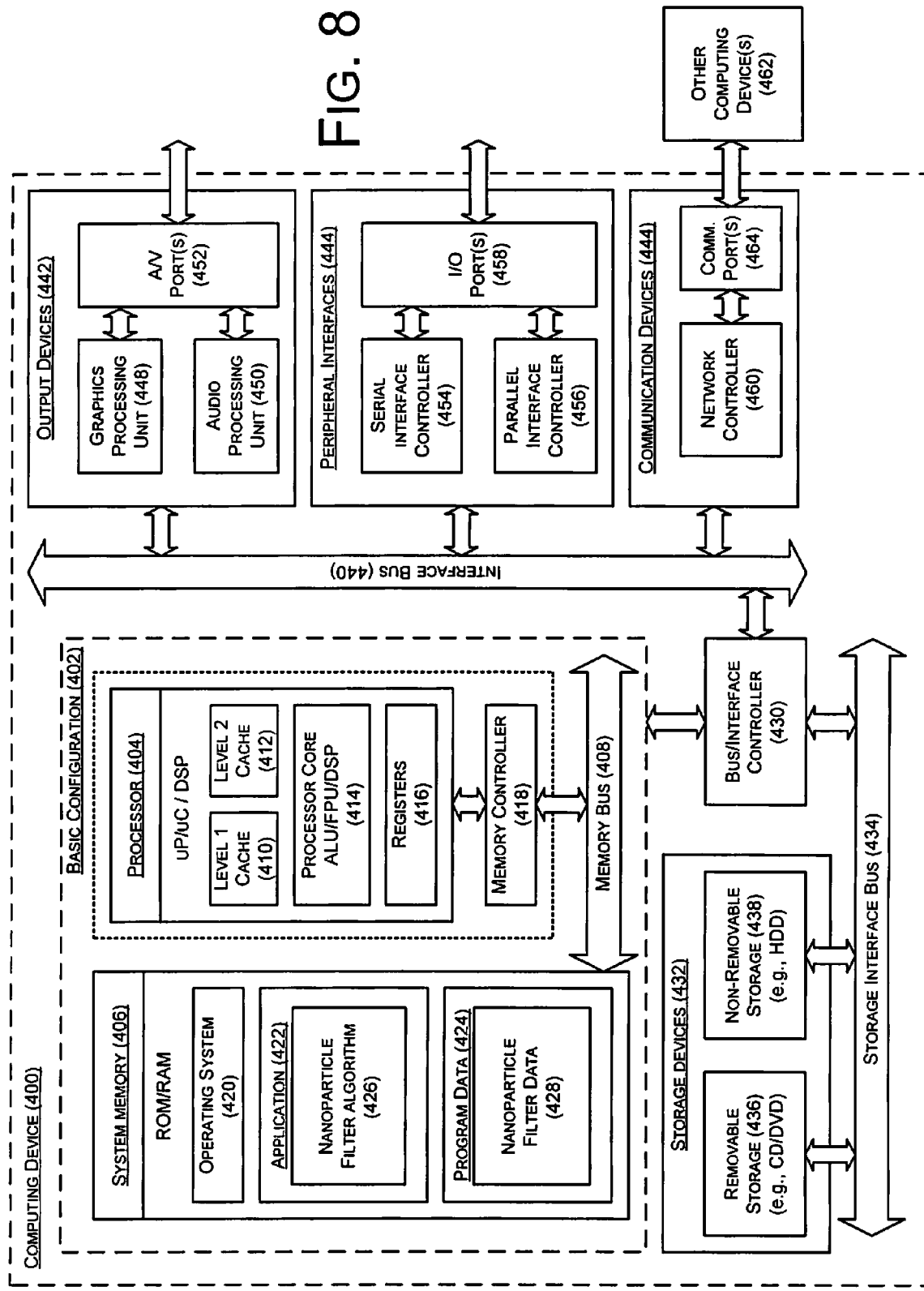
FIG. 8 is a block diagram illustrating some example computing devices that are adapted to implement a nanoparticle filter.

FIG. 8 is a block diagram illustrating an example computing device 400 that is arranged to implement a nanoparticle filter in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a nanoparticle filter algorithm 426 that is arranged to perform the functions as described herein including those described previously with respect to FIGS. 1-7. Program data 424 may include nanoparticle filter data 428 that may be useful for a nanoparticle filter as is described herein. In some embodiments, application 422 may be arranged to operate with program data 424 on operating system 420 such that a nanoparticle filter may be provided. This described basic configuration 402 is illustrated in FIG. 8 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for moving nanoparticles in a fluid, the method comprising:
applying a first light to the fluid to create a first plasmon, wherein the first plasmon is effective to aggregate the nanoparticles to generate a nanoparticle aggregation; and
applying a second light to the fluid to create a second plasmon, wherein the second plasmon is effective to move the nanoparticle aggregation to a location.

2. The method as recited in claim 1, wherein the first and second light have a wavelength of about 300 nm to about 700 nm.

3. The method as recited in claim 1, wherein:
the fluid is a provided into a chamber;
the chamber includes a metal film;
the first plasmon is created in the metal film; and
the first plasmon is coupled to the fluid.

4. The method as recited in claim 1, further comprising prior to applying the first light,
feeding the fluid into a chamber through an inlet port of the chamber; and
closing the inlet port.

5. The method as recited in claim 1, further comprising while applying the first light and while applying the second light:
feeding the fluid into a chamber through an inlet port; and
feeding the fluid out of the chamber through an outlet port.

6. The method as recited in claim 1, further comprising:
repeating applying the first light and applying the second light a number of times at a particular repetition rate.

7. The method as recited in claim 1, wherein the first plasmon is created in the fluid.

8. The method as recited in claim 4, further comprising applying the first light to a first location of the chamber to create the first plasmon.

9. The method as recited in claim 8, further comprising applying the second light to a second location of the chamber to create the second plasmon, and wherein the first and second plasmons are effective to move the nanoparticle aggregation to the location.

10. The method as recited in claim 1, wherein:
   the fluid is provided into a chamber,
   the chamber includes a plurality of walls and the method further includes
   applying respective first and second lights to respective first and second locations on each of the walls.

* * * * *

UNITED STATES PATENT AND TRADEMARK OFFICE
CERTIFICATE OF CORRECTION

PATENT NO. : 8,475,665 B2
APPLICATION NO. : 13/059131
DATED : July 2, 2013
INVENTOR(S) : Casasanta, III It is certified that error appears in the above-identified patent and that said Letters Patent is hereby corrected as shown below:

In the Drawings:

In Fig. 8, Sheet 6 of 6, in Box "404", delete "uP/uC / DSP" and insert -- µP/µC/DSP --, therefor.

In the Specification:

In Column 2, Line 21, delete "filter;" and insert -- filter. --, therefor.

In Column 2, Line 22, delete "all" and insert -- All --, therefor.

In Column 4, Line 23, delete "Processor 128" and insert -- Processor 126 --, therefor.

In Column 5, Line 1, delete "$132_{a2}$" and insert -- $132a_2$ --, therefor.

In Column 6, Line 40, delete "give" and insert -- given --, therefor.

In the Claims:

In Column 10, Line 49, in Claim 3, delete "fluid is a" and insert -- fluid is --, therefor Signed and Sealed this
Nineteenth Day of November, 2013

Teresa Stanek Rea
*Deputy Director of the United States Patent and Trademark Office*